United States Patent [19]
Yilmaz

[11] 3,762,829
[45] Oct. 2, 1973

[54] ADJUSTABLE TOOL GUIDE AND SUPPORT
[76] Inventor: Mahmut Yilmaz, 1582 Oak St., Evanston, Ill.
[22] Filed: Oct. 20, 1971
[21] Appl. No.: 190,795

[52] U.S. Cl.................. 408/105, 408/76, 408/237, 408/236, 408/115
[51] Int. Cl........................................... B23b 45/14
[58] Field of Search.................... 408/103, 104, 105, 408/107, 108, 109, 236, 76, 237, 115

[56] References Cited
UNITED STATES PATENTS
| 1,095,162 | 4/1914 | Mosher | 408/236 |
| 579,037 | 3/1897 | Bulock et al | 408/104 |
| 2,492,783 | 12/1949 | Chamberlain | 408/104 |

Primary Examiner—Francis S. Husar
Attorney—Watson D. Harbaugh et al.

[57] ABSTRACT

An adjustable support and centering guide is disclosed for clamping a working tool to the end of a large diameter work piece or shaft so that the tool can be manipulated and secured at a desired or central position against an end surface thereof. In one embodiment a clamp and seat are provided to affix a hinged paramagnetic support member upon the end of a shaft for use with an electromagnetic drill chuck tool. The paramagnetic support member is pivotally mounted to initially bring the tool against the end of the shaft and slidably mounted for reciprocation upon both vertical and lateral axes by the seat in order to accurately locate the tool in relation to the end surface. A pair of easily manipulated cam locking pins maintain the upright position of the centering guide to allow the working tool to remain centered or otherwise oriented with respect to the shaft and do work thereon.

5 Claims, 6 Drawing Figures

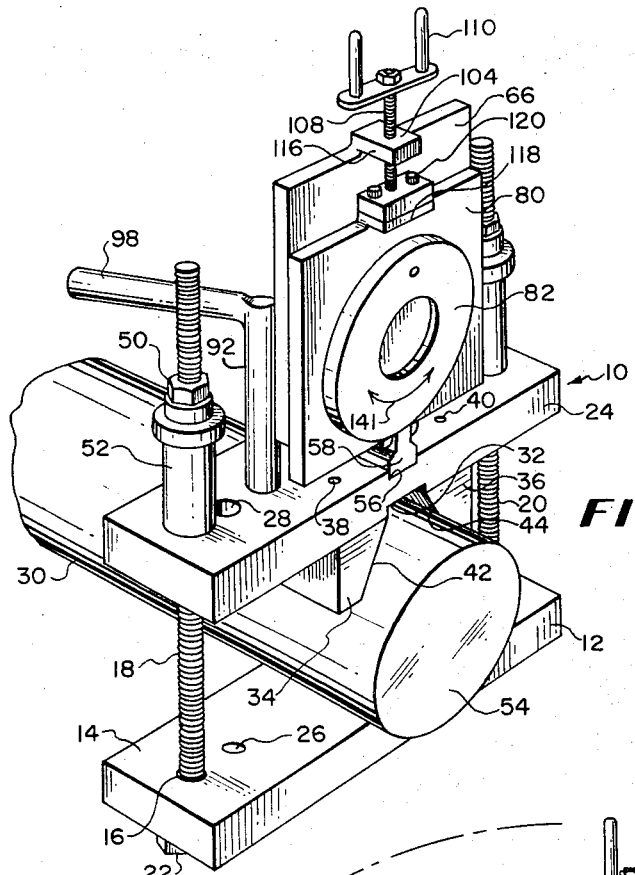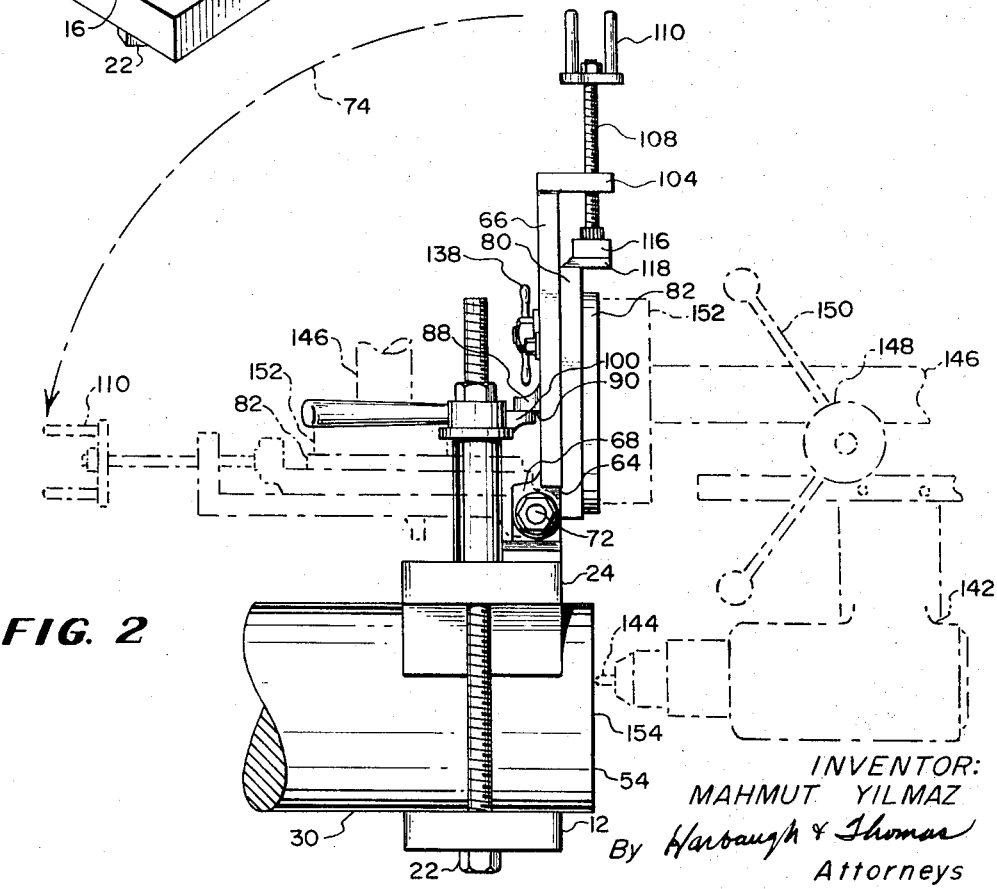

INVENTOR:
MAHMUT YILMAZ
By Harbaugh & Thomas
Attorneys

ADJUSTABLE TOOL GUIDE AND SUPPORT

BACKGROUND OF THE INVENTION

Few center drilling fixtures that actually mount on the work piece are available in the art. Some such tools have a plurality of pivot arms extending out and around the end of the work piece and do not include micro control, or adjustment of the parts. Nor can these devices be locked in place by simple means that are easily detached. Most are for use on drill machines that do work along fixed axes and cannot accommodate or be used on large diameter, long and heavy shafts. A number of hand-operated drill centering jigs are known in the art for use in positioning a drill centrally of the end of a shaft or work pieces. Other devices have slidable bushings or depend on spring-loaded parts and cannot be used with a magnetic chuck.

SUMMARY OF THE INVENTION

This invention concerns a centering drill guide particularly adapted for use with large diameter elongated shafts which cannot be easily moved which orients itself to a horizontal position for attachment of the drill using a magnetic chuck and is pivotal to a working position, locked in that position and includes easily manipulated adjustments to set the drill at the desired location against the end of the shaft.

In one embodiment the device includes screw clamping means attachable around and upon the shaft adjacent its end, a support plate is hinged to the top of the clamp having a horizontal position to receive the drill and chuck and a vertical stop position normal to the center of the shaft, the support plate includes a slidable and rotatable or pivotal chuck seat that receives the drill with micro adjustable means therefor adapted to raise and lower the drill and move its axis laterally of the face of the end of the shaft.

DESCRIPTION OF THE DRAWINGS

An embodiment of this invention is shown in the drawings wherein:

FIG. 1 is an isometric view of the centering device affixed to the end of a large shaft which is only partially shown;

FIG. 2 is a side elevational view of the centering device clamped upon the end of a large shaft, as illustrated in FIG. 1, with a magnetic chuck equipped drill shown in broken lines in work position and with said device also shown in broken lines in its unlocked and folded position;

THE PREFERRED EMBODIMENT

Figure 3:
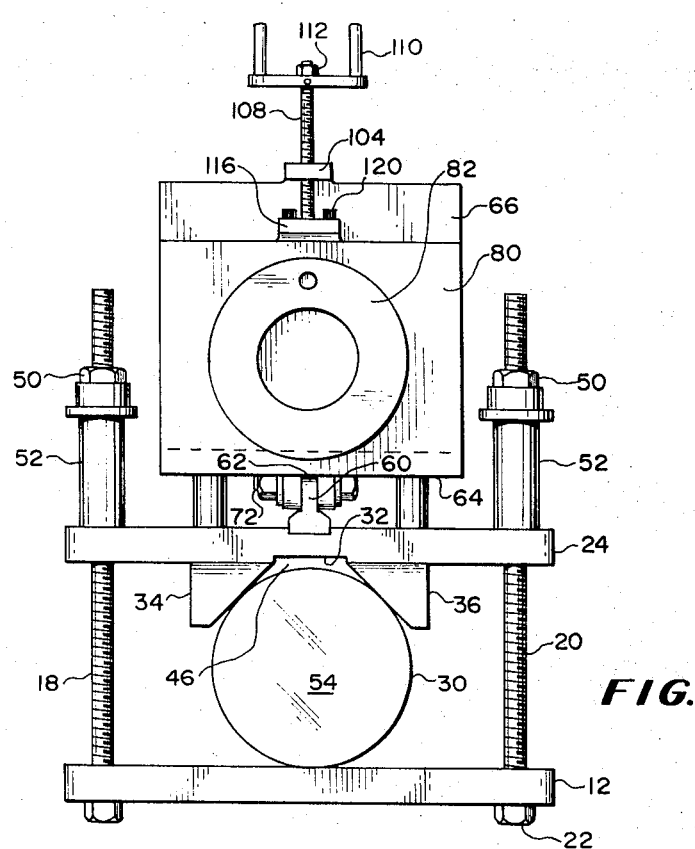
FIG. 3 is a front plan view of the device as shown in FIG. 1 clamped to a work piece.

Referring to FIG. 1 the device 10 of this invention is shown to comprise a base member or bottom clamp plate 12 which is a generally rectangular rigid piece having a flat top surface 14 and provided with suitable bore holes 16 (see also FIG. 6) at the ends to slidably receive the identical threaded shafts 18 and 20 each of which is provided with a head end 22 that is larger than the respective bore holes. The bores 16 can be countersunk to receive the head ends 22 so that the bottom of the plate 12 can be flush on a floor or bench. The top clamp plate 24 is the same general rectangular shape as the bottom or base member 12 and has suitable aligned bores (not illustrated) to slidably receive the threaded shafts 18 and 20 therethrough so that the two plates are opposed to each other in clamping relationship. Each of the plates 12 and 24 can have additonal bore holes, as indicated at 26 and 28 adjacent their ends and inside the outer bore holes 16 etc. to accommodate the shafts 18 and 20 therethrough and maintain any desired spacing to the sides of the work piece which is indicated at 30. Instead of aligned bore holes such as 26 and 28, slots may be provided to allow lateral adjustment of the distance between the shafts 18 and 20.

Figure 4:
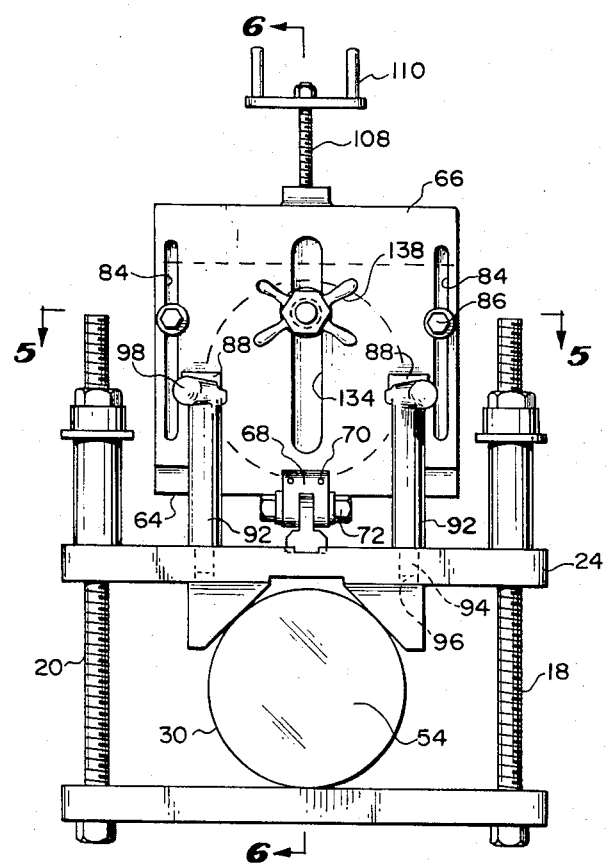
FIG. 4 is a plan view of the back or reverse side of the device as shown in FIG. 3.
Figure 5:
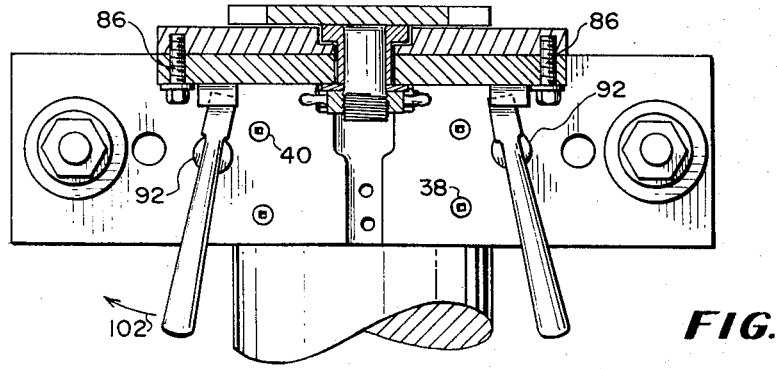
FIG. 5 is a top view partly in section as taken along the lines 5—5 of FIG. 4.
Figure 6:
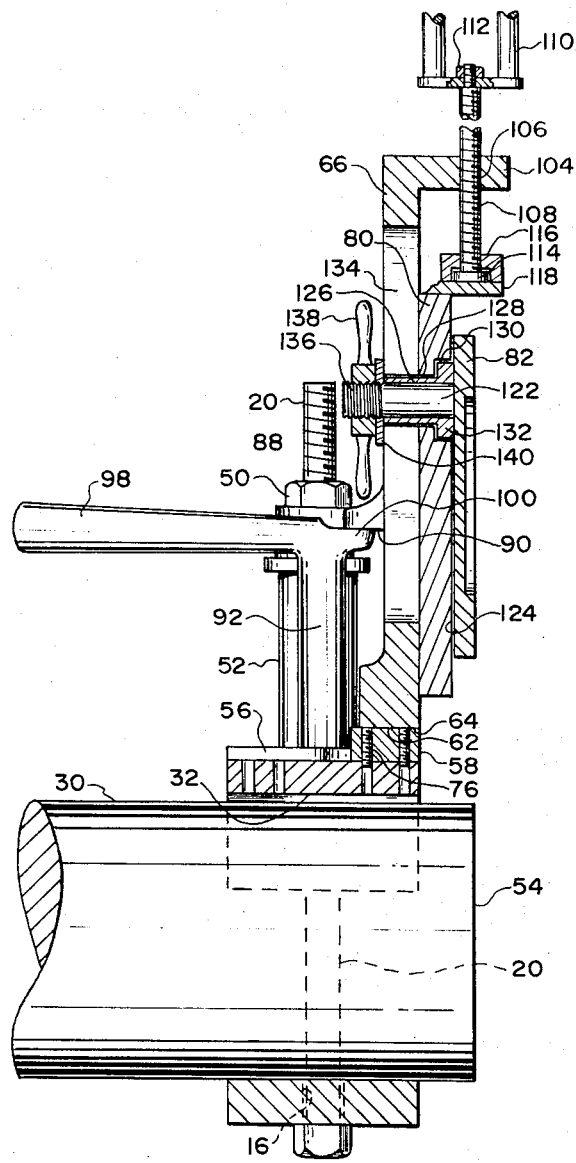
FIG. 6 is a side view partly in section taken along the lines 6—6 of FIG. 4.

A relatively wide shallow groove 32 is provided transversely of the bottom surface of the top clamping plate 24 and substantially central of the longitudinal axis of the plate. As shown in FIG. 6 the groove 32 extends the total width of the plate 24 and is normally spaced from the top surface of the work piece 30. The underside of the plate 24 also carries a pair of oppositely oriented wedge-shaped shoes 34 and 36 held in place by the pairs of heavy Allen screws 38 and 40 on each side (see FIG. 5). The wedge shoes present opposing flat beveled surfaces 42 and 44, respectively, which straddle the top surface of the work piece 30 and hold the curved opposite sides thereof. The channel or groove 32 is normally between the shoes so that the effective diameters of work piece that can be accommodated is increased and two point or two sided contact at the top of the work piece is assured. The bottom of the work piece is received upon the flat top surface 14 of the lower plate 12 as the third point of support for the work piece. This is clearly shown in FIGS. 3 and 4 wherein the space 46 is provided above the work piece 30. It is apparent that adjustment of the shoes 34 and 36 toward the center of the groove will allow smaller diameter shafts to be accommodated and adjusting them away from one another will accommodate very large work pieces while still maintaining three point contact and rigidity. Consequently, the device can be used for the largest size work pieces upon which work is to be accomplished.

The clamping action of the plates 12 and 24 is provided by the large nuts 50 which like the shafts 18 and 20 are interchangeable to the right or left sides of the plates. The nuts 50 can be hexagonal or square to fit a wrench as desired and can screw down on the shafts flush with the top plate 24 or be provided with the pair of bushings 52 that encompass the shafts in sliding relationship and are bound between the nuts and the top plate as torque is applied. Actually, the clamping arrangement works sufficiently well with only hand or finger tightening of the nuts and large wing nuts can be used for this purpose. The work piece 30 is illustrated as a round shaft but it is obvious that it could be any heavy awkward elongated member on which work is to be done on the end surface or face 54 thereof.

The top plate 24 has a second transverse groove or slot 56 preferably square in cross-section, to receive the lower hinge support 58 having an upstanding tab or boss 60 and a flat top 62 which serves as a pivot stop for the bottom edge 64 of the hinge plate 66. This hinge plate is provided with the bifurcated yoke member 68, affixed to the back side by means of the bolts or screws 70. The yoke members are suitably cross bored so that with the boss 60 therebetween, the cross pin or bolt 72 is received therethrough to provide hinge or pivot for the plate 66. These parts are constructed so that the plate rotates freely about the pin 72 in the manner shown by the arrow 74 in FIG. 2 about 90° from the vertical position of FIG. 1 and also so that as the plate 66 is hinged to the vertical, the bottom edge 64 strikes the flat top 62 of the boss 60 and a true vertical alignment with the longitudinal axis of the work piece is attained. The stop relationship is shown in FIG. 6 wherein surface edge 64 meets the top 62 of the boss 60. The Allen screws 76 can be used to hold the support 58 within the groove 56.

The hinge plate 66 is provided with means for adjustably supporting the sliding plate 80 on the front side thereof which in turn carries the paramagnetic mounting plate 82 in rotatable or pivotable relationship for purposes to be described. Thus, the hinge plate 66 has the outer elongated vertical slots 84 near the outer edges thereof. As is apparent from FIGS. 3 and 4, the plate 66 is spaced between the vertical shafts 18 and 20 so that it is clear to assume its vertical position. The sliding plate 80 has suitable threaded blind bores to receive the bolts 86 which bear washers or the like to engage across the width of each of the slots. The plate 80 can thus be slid vertically upon the flat face of the plate 66 and by tightening the bolts 86 held at the desired radial relationship.

The back of the plate 66 also carries the pair of laterally spaced lugs 88 having the flat under surfaces 90. The lugs 88 are preferably located so that their surfaces 90 are coplanar and the same or substantially the same distance from the lower edge 64. A pair of substantially identical and interchangeable locking pins 92 is provided with stub shafts 94 at their bottom ends which are rotatably received in the pair of spaced bore holes 96 in the top clamping plate 24. The stub shafts can fit loosely in the holes 96 so that the locking pins are easily inserted and removed and are rotatably supported thereon. Each of the locking pins has a radial handle 98 and a beveled lug or cam 100 which engages under the aligned lugs 88 and against the flat surface 90. It is seen that with the hinge plate 66 moved to its vertical position against the stop 62 the locking pins 92 can be inserted with their stub shafts 94 in the bore holes 96 and each turned with the handles 98 in opposite directions to the positions shown in FIG. 5 so that their cams 100 engage under the lugs 88 and tighten the plate 66 in this position. Quick release of the locking pins 92 is accomplished by turning in the direction of the arrow 102 for example (FIG. 5). If desired, the cams can be oppositely beveled so that these pins operate in reverse of the foregoing.

The hinge plate 66 is provided with the tab 104, at its top edge and central thereof on the front side. The tab 104 has a threaded bore 106 to receive the threaded shaft 108 which carries and is rotated by the handle 110 affixed thereto by a suitable locking nut 112. The lower end of the shaft 108 has the flange 114 affixed thereto or a part thereof which is rotatably journaled within the housing or cap 116 secured to the center tab 118 by the stud bolts 120. This arrangement provides a means for accurately and finitely causing the plate 80 to slide up and down on the face of the plate 66 guided by the pins 86 in the slots 84.

The paramagnetic plate 82 is pivotally and/or rotatably mounted on the sliding plate 80 by means of the stud bolt 122 affixed to its back side 124 which slides against the plate 80. The bolt 122 is off center of the plate 82, in one embodiment, and the plate hangs therefrom by means of the bushing 126 that extends through the bore holes 128 in the plate 80. The bore hole 128 is counter bored at 130 to receive the flange 132 of the bushing 126. The pivot plate 66, which carries this assembly has the elongated central slot 134 extending parallel to and in between the spaced slots 84, through which the bushing 126 and bolt 122 extended in sliding relationship. The end of the bolt has the threads 136 engaged by the hand wheel 138 with the washer 140 overlapping the slot 134. Accordingly, the paramagnetic plate 82 can be swung in either direction in an arc about the shaft 122 as indicated by the arrow 141 with the shaft 122 as the pivot point.

Referring to FIG. 2, a working tool is illustrated in broken lines by the drill 142 having the drill bit 144 adapted to do work upon the end 54 of the shaft 30 supported by the centering guide of this in-vention. The frame support for the drill is illustrated at 146 including the hand wheel 148 with suitable radial levers used to advance the drill while a bore hole or other work is being performed by the tool as is known in this art. The frame includes an electromagnetic chuck 152, the face of which attaches to the paramagnetic plate 82 when the coil therein is activated by current.

FIG. 2 also illustrates that the centering guide of this invention is pivoted on the shaft 72 to the horizontal position shown in broken lines whereby the paramagnetic plate 82 is essentially parallel with the shaft 30 held by the clamping plates 12 and 24. In this position, the electromagnetic plates is attached to the paramagnetic plate 82 with the supporting member 146 in the vertical position shown. The drill (not shown) would then be in a vertical position and retracted upwardly in relation to the support 146 by the feed wheel 148. The locking pins 92 would not be in place.

The assembly is then swung 90° until the edge 64 of the plate strikes the surface 62 of the hinge support 58, placing the assembly in the full line position shown in FIG. 2. The locking pins 92 are inserted in the bore holes 96 and their cam lugs 100 turned into wedging contact with the lugs 88. This locks the centering device in a plane perpendicular to the axis of the work piece 30 and in planar or coplanar relationship with the end surface 54 as desired. The drill 144 is thus oriented to an axial position with the work piece as illustrated.

Assuming that a center bore is to be drilled in the end 54 of the work piece 30, the center would be located by known means and prick-punched as at 154 as a guide for the drill 144. The hand wheel 110 is turned to lower the plate 80 until the drill is on a line horizontal with the punch mark 154. Then the hand wheel 138 is loosened and the plate 82 rotated on the shaft 122 until the drill and punch mark are aligned. The wheel 148 is manipulated so that the drill makes contact within the punch mark and the drilling operations can begin.

Alternatively, the plate 82 can be pivoted to bring the drill above the punch mark and then locked and the hand wheel or crank 110 turned to lower the plate 80 so that the drill 146 is aligned with the punch mark.

It is apparent that other means for holding the working tool to the centering guide of this invention can be used. The plate 82 can be formed of any metal or alloy or suitable strength and the chuck 152 can also be formed as a plate or base member without having an electro-magnet therein. In other words, the support of this invention can be used with working tools that are not equipped with a magnetic chuck. In this instance, the plate 82 and the base or bracket 152 can be bolted together or otherwise attached in a manner which holds these parts firmly. Instead of a pair of locking pins 92 a single locking pin can be used. The shaft 108 can operate like the tail stock of a lathe or use the traveling nut structure instead of the housed flange 114. Thus, the journal provided by the cap 116 can house a traveling nut which would be represented by the flange 114 threadably engaging the shaft 108. The tab 118 would have a bore hole to allow reciprocation of the shaft therethrough. Other extensible means can be provided to obtain vertical adjustment of the sliding plate 80. The invention concerns therefore the general organization of clamping means including opposed plate members or the equivalent to engage opposite sides of the work piece; pivotal support means attached to one of the plates, stop means to hold the support means in a substantially vertical position, a plate member for attachment to the base of the working tool and means to adjustably move the plate member vertically and arcuately in the plane vertical to the axis of the work piece. The term "plate" is used herein to denote any generally flat rigid member provided with plane surfaces where deemed necessary to provide sliding contact with the other members and not necessarily having plane surfaces elsewhere in the structure.

What is claimed is:

1. A centering guide for a working tool having a magnetic chuck comprising:

clamping means having opposed plate members adapted to engage a work piece on opposite sides in fixed relationship adjacent an end of the work piece;

support means pivotally attached to one of said plate members on a side away from said work piece;

stop means cooperating with said pivotal attachment whereby said support means is adapted to pivot to a position substantially vertical to the axis of said work piece;

a paramagnetic plate supported by said support means for attachment of the magnetic chuck of said working tool thereto;

means adjustably supporting said paramagnetic plate in selected fixed positions radially of said work piece along said vertical axis; and means adjustably supporting said paramagnetic plate in selected fixed positions arcuately of said work piece in the plane of said vertical axis.

2. A guide and support for a driven working tool having a magnetic chuck comprising:

a base including means for clamping a support plate against a side of an elongate work piece;

a hinge plate pivotally mounted on said support plate and being movable to and from a position substantially vertical to the longitudinal axis of said work piece;

a stop member associated with said hinge plate for vertical alignment of said hinge plate in said one of said selected positions;

a tab member extending from said hinge plate;

a locking member rotatably supported by said support plate and having a cam lug therein;

said locking member being rotatable to a position under the tab member of said hinge plate to lock said hinge plate in the vertical position;

a paramagnetic tool holding member slidably and pivotally mounted on said hinge plate and adapted to be engaged by said magnetic chuck; and means to affix said tool holding member in selected fixed radial and vertical positions in relation to said hinge plate whereby the working tool is positionable in working relationship with a surface of said work piece.

3. A guide and support for a driven working tool having a bracket support comprising:

a base including a support plate for clamping against a side of work piece;

a hinge plate pivotally mounted on said support plate and being movable to and from a position substantially vertical to the longitudinal axis of said work piece;

means to lock said hinge plate in said vertical position including a stop member against which the hinge plate engages in its vertical position;

a lug member is provided on said hinge plate;

a locking pin is provided having a radial cam adapted to be turned under said lug member to lock said hinge plate against said stop member;

a tool holding member slidably and pivotally mounted on said hinge plate and adapted to be attached to the bracket support of said working tool; and means to affix said tool holding member in selected fixed radial and vertical positions in relation to said hinge plate whereby said working tool is positionable in working relationship at selected fixed points thereagainst.

4. A guide and support for a driven working tool in accordance with claim 3 in which:

said tool holding member comprises a pair of plates supported by said hinge plate, one of said plates being vertically and slidably adjustable upon a face of said hinge plate, and the other being rotatably mounted upon the other side of said sliding plate, the axis of rotation being vertically offset from its center whereby said working tool is movable in an arcuate path in relation to the work piece.

5. A guide and support for a driven working tool in accordance with claim 4 including:

an offset axis member for said rotatable plate, a journal in said sliding plate for said axis member, a vertical guide slot in said hinge plate to receive the extended end of said axis member, means threadably engaging the extended end of said axis member to clamp upon said journal and retain said rotatable plate in selected arcuate positions in relation to said sliding plate, and vertical adjustment means for said sliding plate including an extensible member adapted to extend and retract said sliding plate and axis member along said guide slot.

* * * * *